(No Model.) 2 Sheets—Sheet 1.
G. L. DALE.
AUTOMATIC EGG BOILER.
No. 375,539. Patented Dec. 27, 1887.
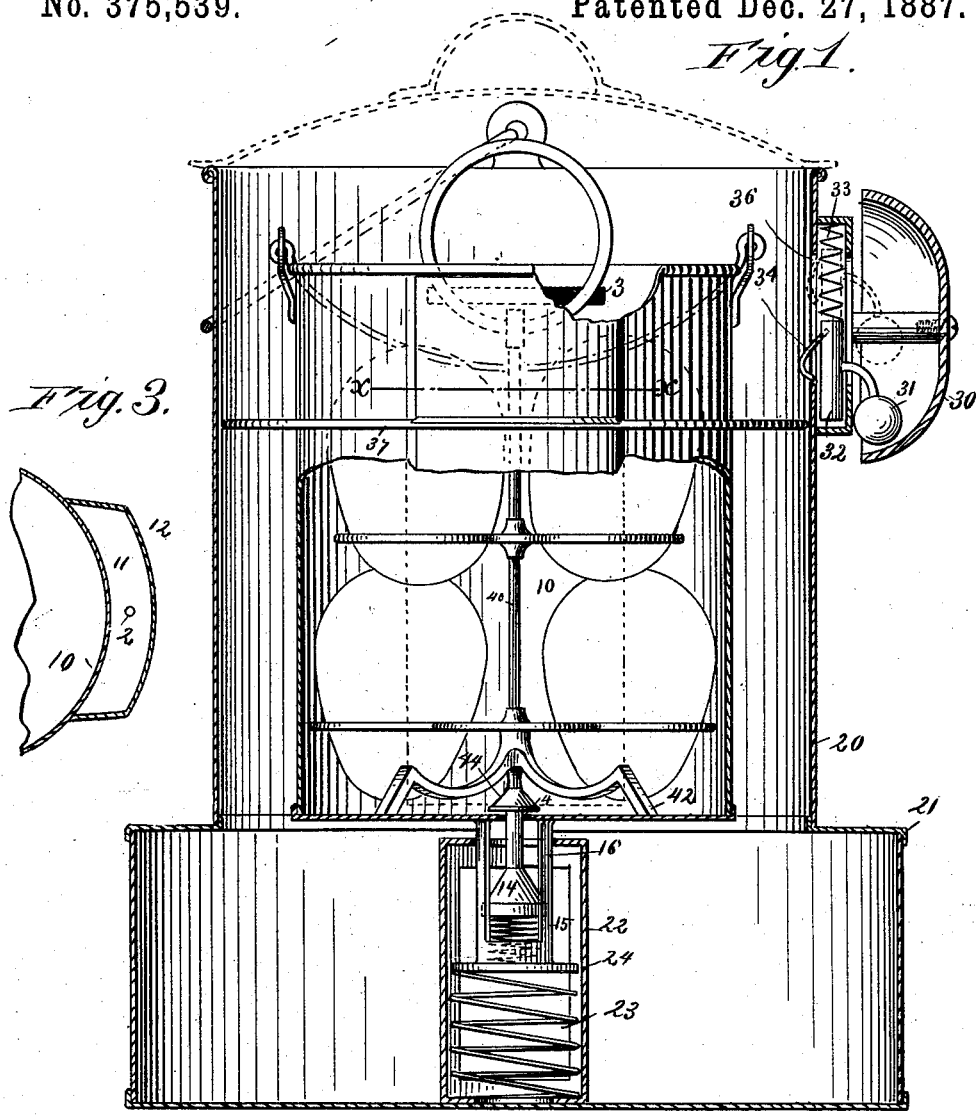
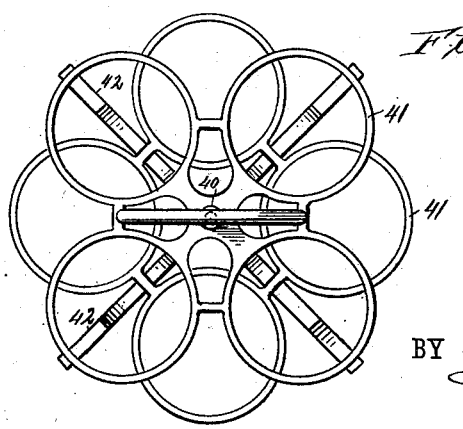
WITNESSES:
INVENTOR:
G. L. Dale
BY Munn & Co
ATTORNEYS.

(No Model.) 2 Sheets—Sheet 2.

G. L. DALE.
AUTOMATIC EGG BOILER.

No. 375,539. Patented Dec. 27, 1887.

WITNESSES:

INVENTOR:
G. L. Dale
BY Munn & Co.
ATTORNEYS.

UNITED STATES PATENT OFFICE.

GEORGE L. DALE, OF NEW YORK, N. Y.

AUTOMATIC EGG-BOILER.

SPECIFICATION forming part of Letters Patent No. 375,539, dated December 27, 1887.

Application filed March 3, 1887. Serial No. 229,622. (No model.)

*To all whom it may concern:*

Be it known that I, GEORGE L. DALE, of the city, county, and State of New York, have invented a new and Improved Automatic Egg-Boiler, of which the following is a full, clear, and exact description.

It is very seldom that a well-cooked egg is obtainable at a hotel table or at the table of a private family, the reason being that the eggs are subjected to too fierce a heat, so that the albumen in coagulating becomes hard and horny instead of creamy and soft, as should be the case when the eggs are to be eaten; and it is to insure the soft creamy state of the albumen that I have devised the novel form of egg-boiling apparatus, which will be hereinafter described, and specifically pointed out in the claims, the object of the invention being to so construct and arrange the egg-containing vessel that the eggs will be subjected to sufficient heat to produce a proper coagulation of the albumen, but so that they will not be subjected to such a fierce heat as they would be liable to come in contact with if the egg-containing vessel were placed in direct contact with the fire or stove over which the eggs are to be boiled; and a further object of the invention is to so construct the egg-containing vessel that it will be discharged of its water just as the eggs contained therein have become sufficiently cooked.

Reference is to be had to the accompanying drawings, forming a part of this specification, in which similar figures of reference indicate corresponding parts in all the views.

Figure 4:
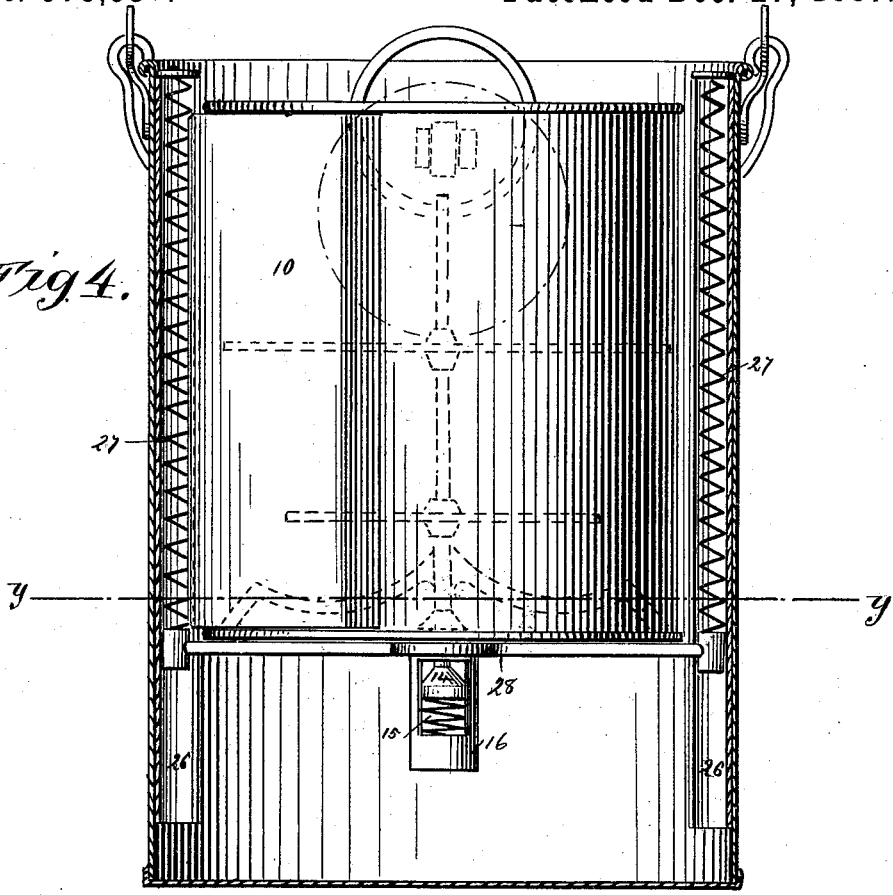
Figure 5:
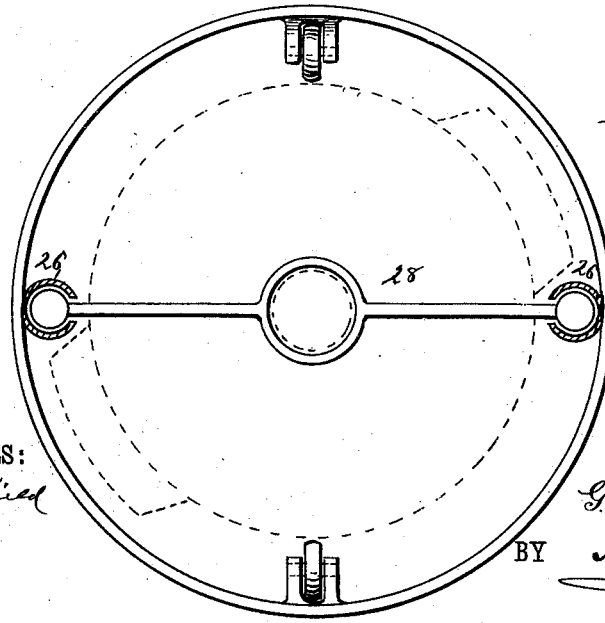

Figure 1 is a central vertical sectional view of my improved automatic egg-boiler, a portion of the inner vessel or egg-receptacle being, however, shown in full lines. Fig. 2 is a plan view of the caster employed in connection with the boiler. Fig. 3 is a sectional plan view of a portion of the egg-containing vessel, the view being taken upon a line corresponding with the line *x x* of Fig. 1. Fig. 4 is a view of a modified form of egg-boiler; and Fig. 5 is a cross-sectional view of the construction illustrated in Fig. 4, the view being taken upon a line corresponding with the line *y y* of said Fig. 4.

The egg-containing vessel of my improved automatic egg-boiler, which egg-containing vessel is shown at 10, is provided with water-chambers 11, that are formed by plates 12, that are secured to the outer face of the vessel 10, a small aperture, 2, being formed through the bottom wall of the chamber 11, while communication with said chamber is established by means of a slit or opening, 3, so that when the receptacle 10 is filled to a level with said slit or opening the water from the vessel 10 will enter the chambers 11 and gradually pass downward through the apertures 2, as will be hereinafter more fully explained.

In the bottom of the vessel 10 there is formed a central aperture, 4, which aperture is normally closed by a plug-valve, 14, that is upheld by a spring, 15, the spring 15 and the valve 14 being carried by a housing, 16, as is clearly shown in Figs. 1 and 4.

In connection with the inner or egg containing vessel, I employ an outer vessel, 20, that is preferably formed with an enlarged bottom portion, 21, in the center of which there is mounted a housing, 22, within which there is arranged a spring, 23, which carries a plunger or follower, 24. In the upper wall of the housing 22 there is a central aperture adapted to receive the housing 16 of the vessel 10, the arrangement being such that when the vessel 10 is empty, or at least does not contain any great amount of water, the spring 23 will support the weight of the vessel; but when the vessel 10 is filled the spring 23 will be compressed and the parts will occupy the position in which they are shown in Fig. 1.

In Fig. 4 I illustrate a construction wherein the vessel 20 is provided with two cylindrical and longitudinally-apertured casings, 26, in which there are arranged supporting-springs 27, one end of each of these springs 27 being secured to the top of the cylindrical casing 26, while the other end of each spring is secured to a yoke, 28, that is arranged to receive the housing 16 of the vessel 10, the tension of the springs 27 in this case being such that while they will support the weight of the vessel 10 they will not support the weight of said vessel when it is filled with water.

If desired, an alarm attachment—such as that represented in Fig. 1—may be provided, said attachment consisting of a gong, 30, of which the hammer 31 is secured to a plunger, 32, that is normally held depressed by a spring, 33.

Upon the plunger 32 there is mounted a spring, 34, that extends inward through a slot, 36, that is formed in the side wall of the vessel 20, while upon the vessel 10 there is arranged an encircling ring, 37, which closely approaches the inner face of the walls of the vessel 20.

The eggs to be boiled may be placed in an egg-basket that is adapted to fit closely within the vessel 10; but said basket must be provided with a central bearing-plate arranged to depress the plug-valve 14 when the basket is inserted within the vessel 10; or, if desired, the eggs could be carried by a caster, such as the one of which a plan view is given in Fig. 2, a side view of the device being given in Fig. 1. This caster consists of a central stem, 40, having two or more egg-trays, while the feet 42 are made so that they will extend outward to closely approach the walls of the vessel 10. Beneath the central stem, 40, of the caster there is arranged a downwardly-extending projection, 44.

Such being the general construction of my automatic egg-boiler, the operation is as follows: The vessel 10 is filled with water, which water is allowed to flow into the chambers 11 and thence to find its way to the bottom of the vessel 20 to prime said vessel and protect it from the heat of the stove. When the vessel 10 is filled, it will move downward within the vessel 20, acting at this time against the tension of the springs by which it is supported. After the vessel 10 has been filled, the boiler may be set upon the stove, and, as the water supplied to the vessel 20 through the apertures 2 of the chambers 11 boils, the temperature of the water within the vessel 10 will be raised, and after said water within the chamber has been raised to a temperature, say, of 160° Fahrenheit, the egg-caster is placed within the vessel 10, and as this caster is so placed within the vessel its projection 44 will strike against the plug-valve 14, and the water within the vessel 10 will immediately commence to flow downward and into the vessel 20, the size of the aperture 4 and of the stem of the valve 14 being so proportioned that the time required for the water to pass from one vessel to the other will be just sufficient to insure a proper cooking of the eggs. As the water runs from the vessel 10 into the vessel 20, the spring or springs by which the vessel 10 is supported will act to raise said vessel, and if the boiler is provided with an alarm—such as that shown in Fig. 1—the rim or hoop 37 will strike against the spring 34, and the plunger 32 will be carried up until the spring 34 bears against the upper defining edge of the slot 36, when any continued upward movement of the vessel 10 will force the spring inward to the position indicated by dotted lines in Fig. 1, the spring being finally carried so that it will clear the hoop 37, after which the spiral spring 33 will be free to act to force the plunger downward, so that the hammer 31 will strike against the gong, thus sounding an alarm in notification of the fact that the water is exhausted from the vessel 10; but in practice it will be found that the eggs contained within said vessel need not be immediately removed therefrom, as after the water has left the vessel the heat will only be sufficient to keep the eggs at the desired temperature without producing any further perceptible increase of coagulation or cooking.

By providing the vessel 10 with the side chambers, 11, through the medium of which the vessel 20 is charged, all danger of overcharging the boiler with water is avoided, for the vessel 20 is so proportioned as to hold all of the water entering from the vessel 10, while if the charging of the vessel 20 be left to chance too much water might be placed therein, and then the boiler would not act as above described.

It will be noticed that the caster is furnished with two egg-supporting trays, the one arranged above the other, the idea of this construction being to provide for the unequal cooking of the eggs carried by the two trays; for as the water leaves the upper eggs prior to the time when it leaves the lower eggs, the said lower eggs will be subjected to the action of the water a greater length of time, and will consequently be more thoroughly cooked.

Although I have described a boiler arranged for use in the boiling of eight eggs, it will of course [be understood that other sizes could be employed.

Having thus fully described my invention, I claim as new and desire to secure by Letters Patent—

1. In an egg-boiler, the combination, with an egg-receiving vessel, of a vessel adapted to receive said egg-receiving vessel, a plug-valve adapted to fit in an aperture formed in the bottom of the egg-receiving vessel, and a spring arranged in connection with the valve, substantially as described.

2. In an egg-boiler, the combination, with an egg-receiving vessel, of a vessel adapted to receive said egg-receiving vessel, and auxiliary chambers formed in connection with the egg-receiving vessel, said auxiliary chambers communicating with the egg-receiving vessel near their upper ends by means of slots, and being provided with small holes or outlets in their bottoms, substantially as described.

3. In an egg-boiler, the combination, with a vessel, 10, of a vessel adapted to support said vessel 10, auxiliary chambers formed in connection with the vessel 10, slots 3, leading to said auxiliary chambers, and openings 2, formed in the bottoms of said auxiliary chambers, substantially as described.

4. In an egg-boiler, the combination, with an outer vessel, of an inner vessel formed with an independent bottom and auxiliary side chambers having lower discharge-outlets and communicating at or near the top with the inner vessel, substantially as described.

5. The combination, with a receiving-vessel, of an inner vessel formed with an aperture in its bottom, a valve arranged in connection with said aperture, a spring arranged in connection with the valve, and an egg-receptacle provided with a bearing-plate adapted to strike against the plug-valve, substantially as described.

6. In an egg-boiler, the combination, with an outer vessel provided with a housing, 22, a plunger, 24, mounted within said housing, and a spring arranged in connection with said plunger, of an inner vessel provided with a central aperture, 4, a housing connected to the bottom of the vessel, a plug-valve mounted within the housing, a spring arranged in connection with the valve, and an egg-receptacle provided with a downwardly-extending projection, 44, substantially as described.

7. In an egg-boiler, the combination, with a vessel, 10, of a vessel adapted to receive the vessel 10, a plug-valve arranged to enter an aperture formed in the bottom of the vessel 10, a spring arranged in connection with the valve, and an egg-receptacle provided with a bearing-plate that is adapted to bear against the plug-valve, said receptacle being formed with two or more tiers of egg-receiving racks, substantially as described.

8. The combination, with an egg-boiling vessel having a water-discharge orifice, of an egg-receptacle having two egg-receiving racks, said racks being arranged the one above the other, substantially as described.

GEORGE L. DALE.

Witnesses:
 EDWARD KENT, Jr.,
 C. SEDGWICK.